US010100521B2

(12) United States Patent
Tangeman et al.

(10) Patent No.: US 10,100,521 B2
(45) Date of Patent: Oct. 16, 2018

(54) POROUS GLASS ROOFING GRANULES

(71) Applicant: 3M INNOVATIVE PROPERTIES COMPANY, St. Paul, MN (US)

(72) Inventors: Jean A. Tangeman, Minneapolis, MN (US); Craig W. Lindsay, Minneapolis, MN (US); Kenton D. Budd, Woodbury, MN (US); Rebecca L. Everman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 138 days.

(21) Appl. No.: 14/426,189

(22) PCT Filed: Sep. 6, 2013

(86) PCT No.: PCT/US2013/058460
§ 371 (c)(1),
(2) Date: Mar. 5, 2015

(87) PCT Pub. No.: WO2014/042987
PCT Pub. Date: Mar. 20, 2014

(65) Prior Publication Data
US 2015/0225957 A1    Aug. 13, 2015

Related U.S. Application Data

(60) Provisional application No. 61/749,726, filed on Jan. 7, 2013, provisional application No. 61/699,672, filed on Sep. 11, 2012.

(51) Int. Cl.
*B32B 17/00*    (2006.01)
*E04D 1/20*    (2006.01)
(Continued)

(52) U.S. Cl.
CPC ............... *E04D 1/20* (2013.01); *C03B 19/06* (2013.01); *C03B 19/066* (2013.01); *C03C 3/06* (2013.01); *C03C 11/00* (2013.01); *C03C 12/00* (2013.01); *C04B 14/24* (2013.01); *C04B 30/00* (2013.01); *C04B 38/009* (2013.01); *E04D 7/005* (2013.01); *C03C 2204/00* (2013.01);
(Continued)

(58) Field of Classification Search
USPC ............. 428/426, 428, 432, 688, 116, 304.4, 428/314.4
See application file for complete search history.

(56) References Cited

U.S. PATENT DOCUMENTS 2,810,660 A    10/1957    Carpenter
3,354,024 A    11/1967    D'eustachio
(Continued)

FOREIGN PATENT DOCUMENTS

AT    288947    2/2005
CN    101239839 A    8/2008
(Continued)

OTHER PUBLICATIONS

International Search Report for PCT International Application No. PCT/US2013/058460, dated Nov. 5, 2014, 4pgs.

*Primary Examiner* — Lauren R Colgan

(57) ABSTRACT

A roofing granule includes a glass substrate and a plurality of pores in the glass substrate such that the roofing granule has a minimum total solar reflectance of at least 50%.

6 Claims, 4 Drawing Sheets

(51) Int. Cl.
*E04D 7/00* (2006.01)
*C03C 11/00* (2006.01)
*C03C 12/00* (2006.01)
*C03B 19/06* (2006.01)
*C04B 14/24* (2006.01)
*C04B 38/00* (2006.01)
*C04B 30/00* (2006.01)
*C03C 3/06* (2006.01)
*C04B 111/00* (2006.01)
*E04D 1/00* (2006.01)

(52) U.S. Cl.
CPC .............. *C04B 2111/00586* (2013.01); *E04D 2001/005* (2013.01); *Y02A 30/255* (2018.01); *Y02B 80/34* (2013.01); *Y10T 428/2982* (2015.01); *Y10T 428/2996* (2015.01)

(56) References Cited

U.S. PATENT DOCUMENTS

| | | | |
|---|---|---|---|
| 3,653,970 A | 4/1972 | Iles | |
| 3,811,851 A | 5/1974 | Mackenzie | |
| 3,900,303 A | 8/1975 | Mackenzie | |
| 3,963,503 A | 6/1976 | Mackenzie | |
| 4,110,085 A | 8/1978 | Balz | |
| 4,303,431 A | 12/1981 | Torobin | |
| 4,582,425 A | 4/1986 | Rabine | |
| 4,764,486 A | 8/1988 | Ishihara | |
| 5,225,123 A | 7/1993 | Torobin | |
| 5,516,348 A | 5/1996 | Conwell | |
| 5,613,995 A | 3/1997 | Bhandarkar | |
| 5,823,661 A | 10/1998 | Mahanay | |
| 6,174,360 B1 | 1/2001 | Sliwinski | |
| 6,454,848 B2 | 9/2002 | Sliwinski | |
| 6,500,544 B1 | 12/2002 | Tiitu | |
| 7,060,658 B2 | 6/2006 | Joedicke | |
| 7,241,500 B2 | 7/2007 | Shiao | |
| 7,452,598 B2 | 11/2008 | Shiao | |
| 7,455,899 B2 | 11/2008 | Gross | |
| 7,641,959 B2 | 1/2010 | Joedicke | |
| 7,811,630 B2 | 10/2010 | Hong | |
| 7,919,170 B2 | 4/2011 | Gross | |
| 8,034,432 B2 | 10/2011 | Joedicke | |
| 8,491,985 B2 | 7/2013 | Kalkanoglu | |
| 8,623,499 B2 | 1/2014 | Viasnoff | |
| 8,637,116 B2 | 1/2014 | Shiao | |
| 2002/0114941 A1 | 8/2002 | Franke et al. | |
| 2003/0152747 A1 | 8/2003 | Fensel | |
| 2005/0238848 A1 | 10/2005 | Fensel | |
| 2006/0016598 A1 | 1/2006 | Urbanek | |
| 2007/0065640 A1 | 3/2007 | Joedicke | |
| 2007/0104949 A1* | 5/2007 | Bunge | C02F 1/281 428/402 |
| 2008/0026183 A1 | 1/2008 | Vanpoulle et al. | |
| 2008/0057268 A1 | 3/2008 | Lu et al. | |
| 2008/0118640 A1 | 5/2008 | Kalkanoglu | |
| 2008/0241472 A1 | 10/2008 | Shiao | |
| 2010/0098777 A1 | 4/2010 | Gould | |
| 2010/0139194 A1* | 6/2010 | Burns | E04D 13/0477 52/309.6 |
| 2010/0151198 A1 | 6/2010 | Khan | |
| 2010/0151199 A1* | 6/2010 | Shiao | E04D 5/12 428/144 |
| 2010/0152030 A1 | 6/2010 | Bai | |
| 2010/0203336 A1* | 8/2010 | Shiao | C04B 18/021 428/404 |
| 2011/0086201 A1 | 4/2011 | Shiao | |
| 2011/0159240 A1 | 6/2011 | Shiao | |
| 2011/0223385 A1 | 9/2011 | Shiao | |
| 2011/0251051 A1 | 10/2011 | Bai | |
| 2012/0157583 A1 | 6/2012 | Shiao | |

FOREIGN PATENT DOCUMENTS

| | | |
|---|---|---|
| CN | 101747029 | 6/2010 |
| CN | 101774764 A | 7/2010 |
| CN | 102001831 A | 4/2011 |
| CN | 102190445 | 9/2011 |
| CN | 102587589 A | 7/2012 |
| DE | 4417391 | 11/1995 |
| DE | 19740757 | 3/1999 |
| EP | 1072572 | 1/2001 |
| EP | 2360129 | 8/2011 |
| GB | 817636 | 8/1959 |
| GB | 2080149 | 2/1982 |
| JP | S53-57221 | 5/1978 |
| JP | S62-171942 | 7/1987 |
| JP | H06-65745 | 3/1994 |
| JP | 3204601 | 1/1997 |
| JP | H09-286674 | 11/1997 |
| JP | 2000-034179 | 2/2000 |
| JP | 2009-096879 | 5/2009 |
| KR | 2001-0095661 | 11/2001 |
| RS | 20100128 | 10/2011 |
| WO | WO 2000-61496 | 10/2000 |
| WO | WO 2003-055822 | 7/2003 |
| WO | WO 2003-087002 | 10/2003 |
| WO | WO 2008-147972 | 12/2008 |
| WO | WO 2009-077589 | 6/2009 |
| WO | WO 2009-136141 | 11/2009 |
| WO | WO 2011-022011 | 2/2011 |
| WO | WO 2011-041033 A1 | 4/2011 |
| WO | WO 2011-101659 | 8/2011 |
| WO | WO 2011-153369 | 12/2011 |
| WO | WO 2012-003449 | 1/2012 |
| WO | WO 2013-165650 | 11/2013 |
| WO | WO 2014-042988 | 3/2014 |
| WO | WO 2014-043212 | 3/2014 |

* cited by examiner

POROUS GLASS ROOFING GRANULES

CROSS REFERENCE TO RELATED APPLICATIONS

This application is a national stage filing under 35 U.S.C. 371 of PCT/US2013/058460, filed Sep. 6, 2013, which claims priority to Provisional Application No. 61/699,672 filed Sep. 11, 2012, and Provisional Application No. 61/749,726 filed Jan. 7, 2013, the disclosures of which are incorporated by reference in their entirety herein.

TECHNICAL FIELD

The present disclosure relates to building materials. More specifically, the present disclosure relates to roofing granules derived from fine glass particles.

BACKGROUND

For energy conservation purposes, it has become more desirable to reflect solar energy off of roofs and other exterior surfaces. Absorbed solar energy increases energy costs in buildings. In addition, in densely populated areas, such as metropolitan areas, the absorption of solar energy increases ambient air temperatures. A primary absorber of solar energy is building roofs. It is not uncommon for ambient air temperature in metropolitan areas to be at least 10° F. warmer than in surrounding rural areas. This phenomenon is commonly referred to as the urban heat island effect. Reflecting solar energy rather than absorbing it can reduce cooling costs and thereby energy costs in buildings. In addition, reducing solar energy absorption can enhance the quality of life in densely populated areas by helping to decrease ambient air temperatures.

Solar energy reflection can be achieved by using metallic or metal-coated roofing materials. However, because the heat emittance of metallic or metal-coating roofing materials is low, such materials do not produce significant gains in energy conservation and reduced costs since such materials restrict radiant heat flow.

Reflection of solar energy can also be accomplished by using white or light-colored roofs. However, white or light-colored sloped roofs are not accepted in the marketplace due to aesthetic reasons. Instead, darker roofs are preferred. However, darker roofs by their very nature through colored or non-white roofing materials absorb a higher degree of solar energy and reflect less.

Non-flat or sloped roofs commonly use shingles coated with colored granules adhered to the outer surface of the shingles. Such shingles are typically made of an asphalt base with the granules embedded in the asphalt. The roofing granules are used both for aesthetic reasons and to protect the underlying base of the shingle. The very nature of such granules creates significant surface roughness on the shingle. Solar radiation thereby encounters decreased reflectivity since the radiation is scattered in a multi-scattering manner that leads to increased absorption when compared to the same coating placed on a smooth surface.

SUMMARY

In one aspect, the present disclosure relates to a roofing granule comprising a glass substrate and a plurality of pores within the glass substrate. The roofing granule has a minimum total solar reflectance of at least 50%. In some embodiments, the roofing granule is uncolored. In some embodiments, the glass substrate comprises silicate or borosilicate glass, and/or may include pre-fused or recycled glass. The plurality of pores may have a volume percent in the glass substrate of less than about 35%. The plurality of pores may include open pores and closed pores. For example, in some embodiments, a volume percent of the closed pores in the glass substrate is greater than about 3% and/or a volume percent of the open pores in the glass substrate is less than about 5%. The plurality of pores may have a diameter of between about 1 µm and 100 µm. In some embodiments, the roofing granule may further include one or more pigments. The one or more pigments may be coated on or blended into the glass substrate. In some embodiments, at least one of the one or more pigments includes an ultraviolet (UV) blocking pigment. In some embodiments, at least one of the one or more pigments includes titania, for example at about 1 to 10 wt %. In some embodiments, the glass substrate comprises a plurality of sections, wherein a first section of the plurality of sections includes a first porosity and/or a first pigment, and a second section of the plurality of sections includes a second porosity and/or a second pigment. In some embodiments, a shape of the granule is any of spherical, blocky, plate-like, or disk-like.

In another aspect, the present disclosure relates to a method for forming a roofing granule including processing bulk glass into a fine glass powder, disposing the fine glass powder in a forming device, and heat treating the fine glass powder in the forming device to cause partial or full densification of the glass powder to form the granule. In some embodiments, the bulk glass is processed by milling (e.g., ball milling or attritor milling) the bulk glass. In some embodiments, the bulk glass is processed into glass powder having particle sizes of about 0.3 µm to about 10 µm. The step of heat treating the glass powder may form dried bricks, cakes, pellets, aggregrates, or agglomerates of the fine glass powder. In some embodiments, the bulk glass may be processed into the fine glass powder with pigments, binders, and/or liquids into the fine glass powder. Alternatively or additionally, the fine glass powder may be blended with pigments, binders, and/or liquids after processing the bulk glass into the fine glass powder. In some embodiments, the granule is coated with one or more pigments. The step of heat treating the glass powder may include heating the fine glass powder to a temperature near or above a softening temperature of the fine glass powder (e.g., 600° C. to 1000° C.). In an implementation, a building construction article is manufactured by forming a plurality of roofing granules and blending the granules into a preferred size and/or shape distribution on a bituminous surface.

In a further aspect, the present disclosure relates to a roofing granule comprising a fully densified glass substrate and one or more pigments, wherein the one or more pigments are coated on or blended into the glass substrate.

In a still further aspect, the present disclosure relates to a granule for industrial applications comprising a glass substrate having an engineered or controlled shape.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
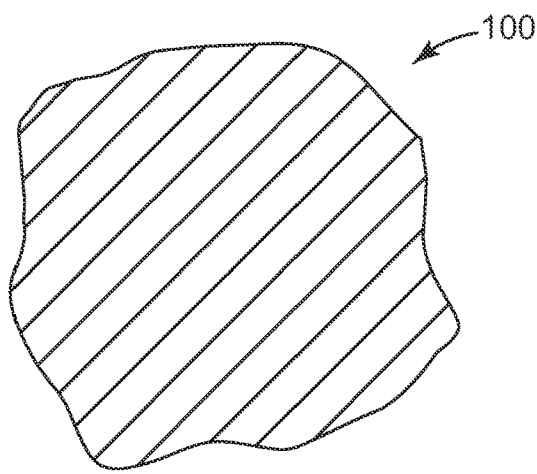
FIG. 1 shows an exemplary roofing granule according to the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

All scientific and technical terms used herein have meanings commonly used in the art unless otherwise specified. The definitions provided herein are to facilitate understanding of certain terms used frequently herein and are not meant to limit the scope of the present disclosure.

The term "uncolored," such as in reference to granules or roofing granules, can be essentially white granules that are not designed to have specific absorption in the visible region of the solar spectra, as would be used to create a desired color appearance other than white.

The term "low solar absorption" can refer to materials that primarily reflect or transmit a large fraction of the total solar spectrum. Such a material would therefore primarily reflect or transmit most of the visible and near IR spectrum. In embodiments, a functional amount of a low solar absorption material (such as a layer of granules of base rock or coated base rock, or a thin layer of a granule coating material) would absorb less than 50%, preferably less than 30%, and preferably less than 20% of the total solar spectrum.

A solar opaque material is one that has low transmission of the total spectra. When a material is both solar opaque and has low solar absorption, it has high total reflectivity of the solar spectrum. Preferably, a functional amount of a solar opaque material (such as a layer of granules of base rock or coated base rock, or a thin layer of a granule coating material) would transmit less than 60%, more preferably less than 40%, and even more preferably less than 30% of the total solar spectrum.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

The present disclosure relates generally to granules derived from fine glass particles. The particles can include controlled porosity and/or pigments. The granules may be used as high total solar reflectance (TSR) white or uncolored granules due to the diffuse reflectance of the pores and low solar absorption of the glass. The glass particles are sufficiently sintered, fused, or coalesced to provide desired strength and sufficiently limited open porosity. In addition, the granules can comprise sufficient additional closed porosity and pigments to provide high reflectivity and ultraviolet (UV) blocking properties. In some embodiments, the granule features enable roofing having a total solar reflectance of up to or even greater than 70% (e.g., 25%, 30%, 35%, 40%, 45%, 50% 55%, 60%, 65%, 70%, 75%, 80%, 85%, or 90%), and have moderate to low cost. Alternatively, the granules of the present disclosure can be used as a baserock for a granule and coated with a high TSR coating. The granules have applicability with a variety of roofing materials, such as shingles, roll roofing, cap sheets, stone coated tile, as well as other non-roofing surfaces, such as walls, roads, walkways, and concrete.

Higher performance white granules can be used for commercial bitumen roofs. Granules that enable roofs with an initial TSR value of at least 70% of the total solar spectrum can meet new building energy rating requirements, resulting in considerably increased value of the roofing product. The granules themselves preferably have extremely high reflectivity, as there can be losses from granule post treatments and incomplete coverage of bitumen surface. Granule cup reflectivity requirements can be as high as about 78% to about 90%.

Three characteristics of ultra-white granules can include sufficiently high scattering power, sufficiently low absorption, and high UV blocking. Scattering power can be controlled by refractive index contrast and particle size. Titania is a useful pigment based on its high refractive index and low absorption.

Other approaches to enhanced scattering include the development or trapping of light scattering pores (as discussed in more detail below), lowering the refractive index of the binder matrix, or using lower cost pigments (such as, for example, alumina) that enhance overall scattering due to the ability to use larger quantities or trap small pores.

In some embodiments, the glass used to form the granules comprises a silicate glass, such as soda lime silica commonly used in windows and bottles. Borosilicates and other glasses can be used to achieve different heat treatment ranges, chemical durability, devitrification, or optical properties. In some exemplary embodiments, aluminosilicate glasses, phosphate glasses, borate glasses, and other suitable glasses as known in the art are used. In the case of high TSR granules, moderate to high purity, low iron glass compositions may be used. In some exemplary embodiments, the glass is a custom manufactured glass. In some exemplary embodiments, the glass is a pre-fused glass and/or recycled glass. Pre-fused glasses are glasses previously made by a melt process, and may include ordinary silicates such as soda lime silica, borosilicate, and other suitable materials. Recycled glasses are pre-fused glasses manufactured for an initial use, such as windows, bottles, labware, etc., for example, and re-processed for another use.

To form the granules, bulk glass is first treated to form a fine glass powder. In some embodiments, the glass particles have particle sizes ranging from about 0.3 µm to 10 µm. Glass powders can be formed by milling methods such as ball milling or attritor milling. In some embodiments, the glass powders is co-milled or post blended with pigments, binders, liquids, and/or other additives such that the additives may be partially or completely incorporated throughout the glass substrate of the resulting granule.

A green body of not fully strengthened or heat treated material results from forming dried bricks, cakes, pellets, aggregates, or agglomerates of the fine glass powder. In some exemplary embodiments, additives are included to improve green strength. For example, zinc additives such as zinc sulfate, and/or zinc borate may improve mechanical strength, and is further believed to improve the chemical durability of the final building material. Other additives, such as aluminosilicates, may also improve mechanical strength. Particle size of the fine glass powder is also believed to affect green strength, with a smaller particle size generally resulting in higher strength. An increased green strength may provide several manufacturing advantages including, for example, lowered production of unwanted fine particles in embodiments in which dried materials are subsequently crushed or reduced to a desired size, and less creation of dust during handling.

The green body formed from the fine glass particles may be heat treated to cause partial or full densification of the glass particulate structure. The heat treatment causes at least partial coalescence, fusing, viscous flow, or viscous sintering of the glass particles. Typically, heat treatment is done near or above the softening point of the glass. For example, for borosilicate glass, heat treatments from about 600° C. to about 1000° C. may be used.

One or more additives may be incorporated with the fine glass particles to lower the glass transition temperature of the glass particles. In various exemplary embodiments, nepheline syenite, feldspar, borax, spodumene, suitable fluxes, and other suitable additives as known in the art may be incorporated with the fine glass particles. Lowering the glass transition temperature may allow lower temperature and/or duration of heat treatment and thus is believed to provide energy savings and may allow incorporation of additives that may break down or otherwise be damaged at higher processing temperatures.

Variations on the described fabrication process are also possible. For example, dried materials larger than desired granule sizes can be crushed prior to or subsequent to firing. In addition, dried or fired material outside the desired granule size range can be recycled into the milling stage of the process. Further, dried particles of desired geometric shapes and sizes can alternatively be made without crushing by methods such as agglomeration, atomization, casting, molding, etc. of liquid slurries or gels. In an exemplary embodiment, such geometric shapes include regular shapes such as rectangular prisms, triangles, tetrahedrons, and other suitable shapes. Granules can thus be provided with a desired shape to optimize coverage, exhibit desired optical properties, or provide other features and characteristics, for example. Still further, components, coatings or additional materials can be adhered to or incorporated on the surfaces of the dried particles prior to firing.

The granules of the present disclosure may be fabricated to include pores to affect the reflectivity of the granules. For example, pores may be formed by partial densification of fine glass particle agglomerates. Pore volume and pore size may be controlled in part by initial glass powder particle size distribution, and by the heat treatment time and temperature. Pores can also result from dissolved gas release during heat treatment, and the composition of the glass and/or additives can be incorporated or designed for this purpose. For high TSR granules, the porosity can be engineered or controlled to provide high reflectivity.

In some embodiments, pore sizes (e.g., diameter or largest distance across) range from less than 1 um to about 100 um. In other embodiments, pore sizes ranging from about 0.3 um to 10 um are preferred. In some cases, the granules include a pore volume percent of between about 0% and 35%. For example, in some preferred embodiments, the pore volume percent is between about 3% and 15%. Pore volume may be controlled to provide high reflectivity in combination with high mechanical durability. Such pore volume is believed to provide high reflectivity in combination with high mechanical durability. In other exemplary embodiments, pore volume percent of 15% to 20%, or greater than 20% may provide a suitable balance of reflectivity and high mechanical durability. In some exemplary embodiments, pore volume percent may be less than 3%. FIGS. 4A through 4E are scanning electronic microscope images of various exemplary embodiments showing two-dimensional views having less than approximately 18%, 16%, 9%, 10%, and 4% area percent of pores, respectively.

Densification of fine glass particles can be used to provide closed porosity of the pores in the granules, either because of local coalescence, surface sealing, or gas evolution. Closed pores can be advantageous for stain resistance or chemical durability. In some embodiments, the granules include a closed pore volume percent of at least about 3% and/or an open pore volume percent of no greater than about 5%.

In some exemplary embodiments, the glass particles are fully sintered or coalesced and fully densified to form a substantially pore free substrate. The glass substrate may exhibit less than 1% by volume of pores, less than 0.5% by volume of pores, nearly 0% by volume of pores, or 0% by volume of pores.

In exemplary embodiments, porosity of building materials derived from fine glass particles may be selected to provide a desired density. While pigments or additives such as titania, zinc oxide, or barium sulfate may have a relatively higher density, and thus raise the density, of the final granule, the porosity may be increased or decreased to increase or decrease the density of the granule. For example, a relatively higher porosity may result in a granule having a density of less than 2.5 g/cm$^3$ or less than about 2 g/cm$^3$, and a relatively lower porosity may result in a granule having a density of greater than 2.5 g/cm$^3$ or greater than about 3 g/cm$^3$, for example. A desired porosity may also be selected in which granules exhibiting different compositions may be blended. Controlling porosity such that granules having different compositions exhibit similar densities may promote uniform distribution and avoid segregation of the different granule types.

Building materials, such as roofing granules, as described herein include a relatively high volume of glass. In various exemplary embodiments, building materials, such as roofing granules, according to the present invention may include greater than 50% by volume of a glass, or greater than 75% by volume of a glass, or greater than 90% by volume of a glass. A building material having greater than 50% by volume of a glass, for example, results in a building material such as a roofing granule including a glass substrate that may incorporate one or more additives, or be coated with one or more coating compositions, to exhibit desired features and characteristics. In certain exemplary embodiments, a granule having 50% by volume of a glass may be desirable to provide specific features and characteristics, as described herein, for example, while in certain embodiments a granule having greater than 50%, 60%, 70%, 80%, 90%, 95% or nearly 100% may be suitable.

In some embodiments, fine glass particles may at least partially crystallize during heat treatment such that a portion of the building material is a glass-ceramic. In various exemplary embodiments, a roofing granule according to the present disclosure may include greater than 5% by volume of a glass-ceramic, or greater than 50% by volume of a glass-ceramic, or greater than 90% by volume of a glass-ceramic, and/or may include both glass portions and glass-ceramic portions.

FIG. 1 provides an exemplary embodiment of a roofing granule 100 having a glass substrate and a plurality of pores (not shown) within the glass substrate. Roofing granule 100 having features and characteristics as described herein may include a minimum total solar reflectance of at least 50%.

In an exemplary embodiment, roofing granules according to the present invention exhibit an average particle size between about 300 μm to about 5000 μm in diameter. A roofing granule as described herein allows various shapes or size distributions to be selected as may be suitable for a particular application. In an exemplary embodiment, roofing granules are providing having a narrow size distribution such that a high percentage of granules have a size within a small range from a median granule size. In various exemplary embodiments, 50%, 75%, or even 90% or more of granules have a mass within 30%, 20%, 10%, 5% or less than 5% of an average granule mass. Accordingly, granules according to the present invention may facilitate a more uniform size distribution that may provide advantages in application and coverage on a substrate, such as a substrate of a roofing shingle. In some exemplary embodiments, a bimodal distribution may be provided that include relatively larger flat square granules, for example, and small tetrahedrons to optimize coverage. Most of a substrate is covered by the relatively larger flat square granules while small tetrahedrons fill gaps that may otherwise exist between the square granules. In some embodiments, undesirable segregation of granules of differing sizes may be alleviated by controlling the density of the granules.

Pigments may be included in the granules to provide optical effects such as color, reflectivity, and UV blocking. For example, for high TSR granules, strongly scattering pigments such as titania can be used to provide both high reflectivity and UV blocking. Other pigments, such as alumina, silicates, and other oxides can also be used. For example, zinc oxides are moderately good scatterers and more UV absorbing in certain wavelength ranges (340-380 nm) than titania. Pigment types and amounts can be chosen based on performance, cost effectiveness, and compatibility with granule process temperatures. For example, in some embodiments, the granules comprise about 1-10 wt % titania. In some embodiments, the granules comprise titania and at least one other pigment. In some embodiments, the granules comprise a near UV absorbing pigment and an additional reflective pigment.

Cool granules reflect a significant portion of incident infrared light. In some cases, the cool granules may be formed of a glass material (such as those described above) bearing one or more coatings or layers of one or more infrared light reflecting pigments. A suitable pigment includes titanium dioxide, which yields a white appearance. Suitable pigments providing a yellow color include V-9415 and V-9416 (Ferro Corp., Cleveland, Ohio) and Yellow 195 (the Shepherd Color Company, Cincinnati, Ohio), all of which are considered yellow pigments.

In some cases, darker pigments may be used that have enhanced NIR reflectivity. These pigments include "10415 Golden Yellow," "10411 Golden Yellow," "10364 Brown," "10201 Eclipse Black," "V-780 IR BRN Black," "10241 Forest Green," "V-9248 Blue," "V-9250 Bright Blue," "F-5686 Turquoise," "10202 Eclipse Black," "V-13810 Red," "V-12600 IR Cobalt Green," "V-12650 Hi IR Green," "V-778 IR Brn Black," "V-799 Black," and "10203 Eclipse Blue Black" (all from Ferro Corp.); and Yellow 193, Brown 156, Brown 8, Brown 157, Green 187B, Green 223, Blue 424, Black 411, Black 10C909 (all from Shepherd Color Co.). Additional pigments of interest, some displaying enhanced infrared light reflectivity, are discussed in Sliwinski et al., U.S. Pat. Nos. 6,174,360 and 6,454,848, both of which are herein incorporated by reference, in their entirety. In other embodiments, the granules include non-IR reflective pigments.

The granules may be coated with one or more of these pigments using any desired technique or process. In some cases, the granules may be coated using an aqueous slurry of pigment, alkali metal silicate, an aluminosilicate, and an optional borate compound. The alkali metal silicate and the aluminosilicate act as an inorganic binder and are a major constituent of the coating. As a major constituent, this material is present at an amount greater than any other component and in some embodiments present at an amount of at least about 50 volume percent of the coating. The coatings from this slurry generally result in a ceramic.

Figure 2:
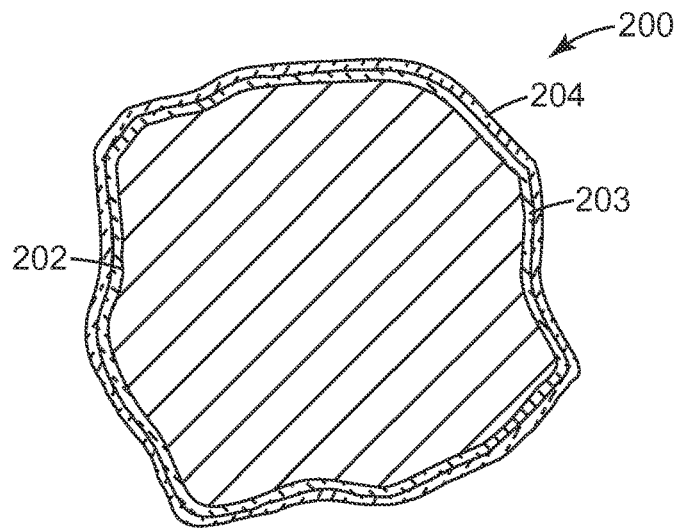
FIG. 2 shows an exemplary roofing granule including coatings according to the present invention.

FIG. 2 provides an exemplary embodiment of a roofing granule 200 including a glass substrate and a plurality of pores (not shown) within the glass substrate, as described herein, and exhibiting a surface 202 coated with a coating 203 that may include one or more components as described herein. In some exemplary embodiments, coating 203 may enter various pores (not shown) such that coating 203 covers surface 202 and/or at least some inner surfaces of granule 200. In some exemplary embodiments, a second coating 204 may be provided over coating 203.

Aqueous sodium silicate may be used due to its availability and economy, although equivalent materials such as potassium silicate may also be substituted wholly or partially therefore. The alkali metal silicate may be designated as $M_2O:SiO_2$, where M represents an alkali metal such as sodium (Na), potassium (K), mixture of sodium and potassium, and the like. The weight ratio of $SiO_2$ to $M_2O$ can range from about 1.4:1 to about 3.75:1. In some embodiments, ratios of about 2.75:1 and about 3.22:1 are particularly preferred, depending on the color of the granular material to be produced, the former preferred when light colored granules are produced, while the latter is preferred when dark colored granules are desired.

The aluminosilicate used can be a clay having the formula $Al_2Si_2O_5(OH)_4$. Another preferred aluminosilicate is kaolin, and its derivatives formed by weathering (kaolinite), moderate heating (dickite), or hypogene processes (nakrite). Other commercially available and useful aluminosilicate clays for use in the ceramic coating of the granules in the present invention are the aluminosilicates known under the trade designations "Dover" from Grace Davison, Columbia, Md. and "Sno-brite" from Unimin Corporation, New Canaan, Conn.

The borate compound, may be sodium borate available as Borax® (U.S. Borax Inc., Valencia, Calif.); however, other borates may be used, such as zinc borate, sodium fluoroborate, sodium tetraborate-pentahydrate, sodium perborate-tetrahydrate, calcium metaborate-hexahydrate, potassium pentaborate, potassium tetraborate, and mixtures thereof. An alternative borate compound is sodium borosilicate obtained by heating waste borosilicate glass to a temperature sufficient to dehydrate the glass.

The structure of the granules can be controlled or selected based upon the application or use in a building construction article. The granules can have homogeneous distributions of pores and pigments, or can have regions within the granules that have different properties. For example, the granules can have core regions with one level of porosity or pigment, and shell or surface regions with a different level of pigment or porosity. Additionally, the granules can be regularly or irregularly shaped. The granules can also have a variety of shape profiles including, but not limited to, spherical, blocky, plate-like, or disk-like. The granules can also be engineered to have a desired shape and blended to provided preferred size and/or shape distributions for optimum packing on bituminous surfaces or for other functions.

Building materials derived from fine glass materials as described herein are believed to provide several advantages. For example, granules from fine glass materials that are sintered, fused, coalesced or otherwise formed at a relatively low temperature near a softening point of the fine glass materials allow pigments and/or other additives mixed with the fine glass particle to exist undamaged and/or unchanged. That is, the pigments and/or other additives may be partially or completely incorporated throughout the glass substrate of the granule while not being functionally altered by the manufacturing process, resulting in a roofing granule having a high percentage of glass and features and characteristics as may be desired for a particular application.

Figure 3:
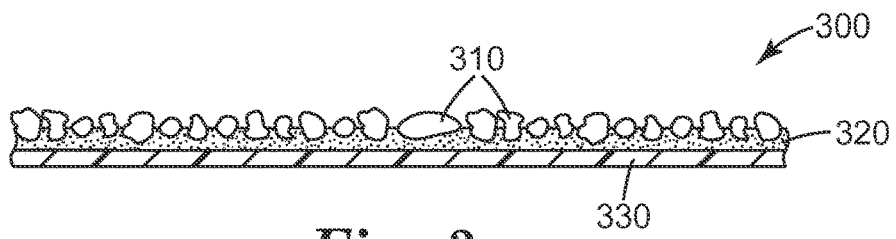
FIG. 3 shows an exemplary roofing product including a plurality of roofing granules according to the present invention.
Figure 4A:
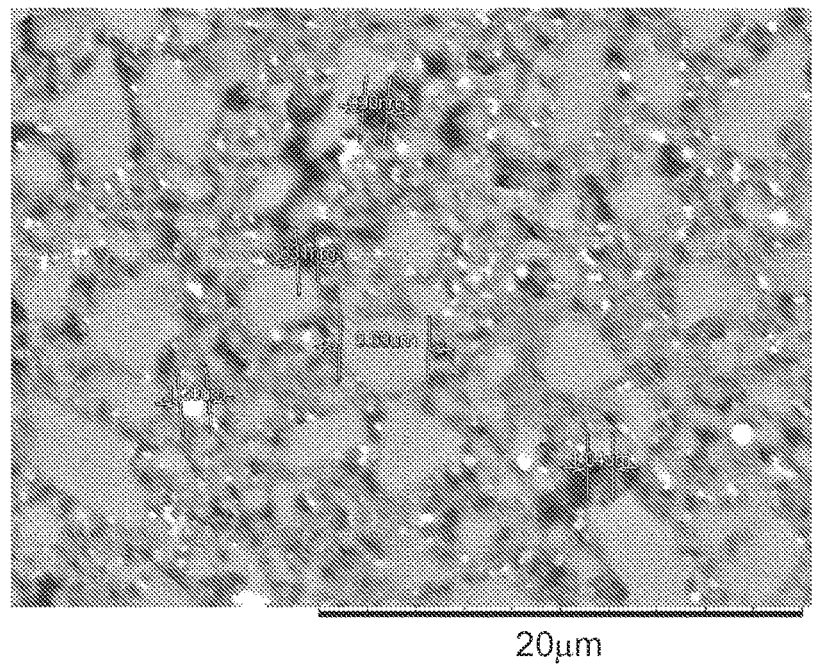
FIGS. 4A-4E are scanning electron microscope images illustrating porosities of example roofing granules formed according to embodiments of the present disclosure.
Figure 4B:
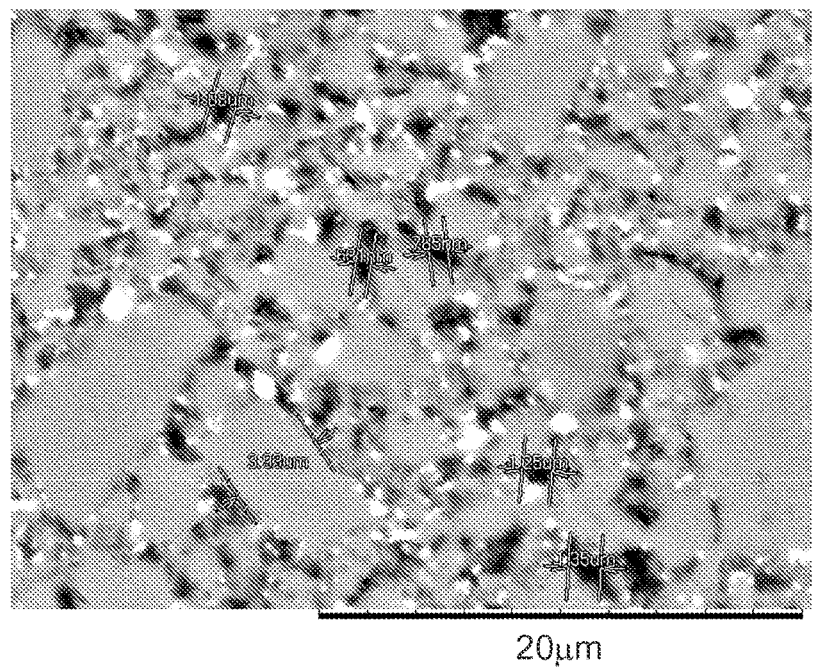
Figure 4C:
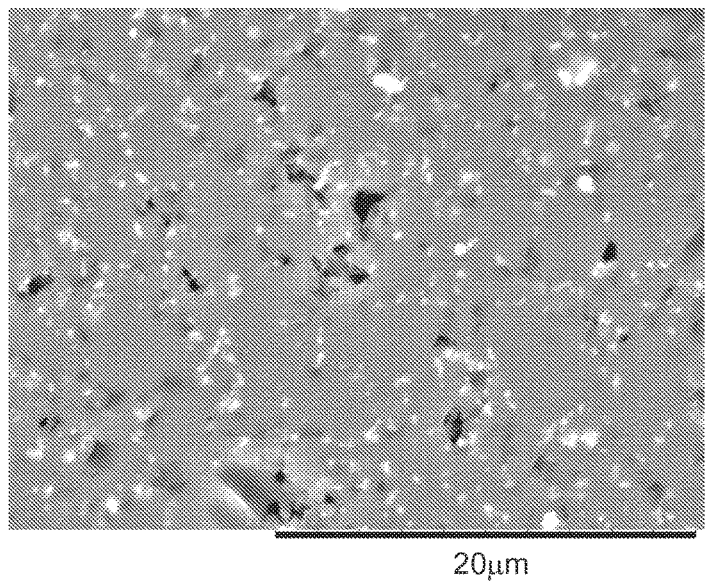
Figure 4D:
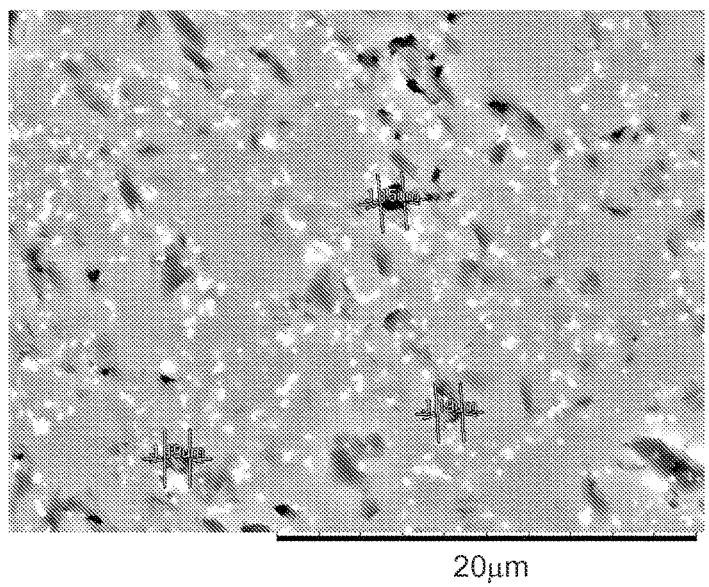
Figure 4E:
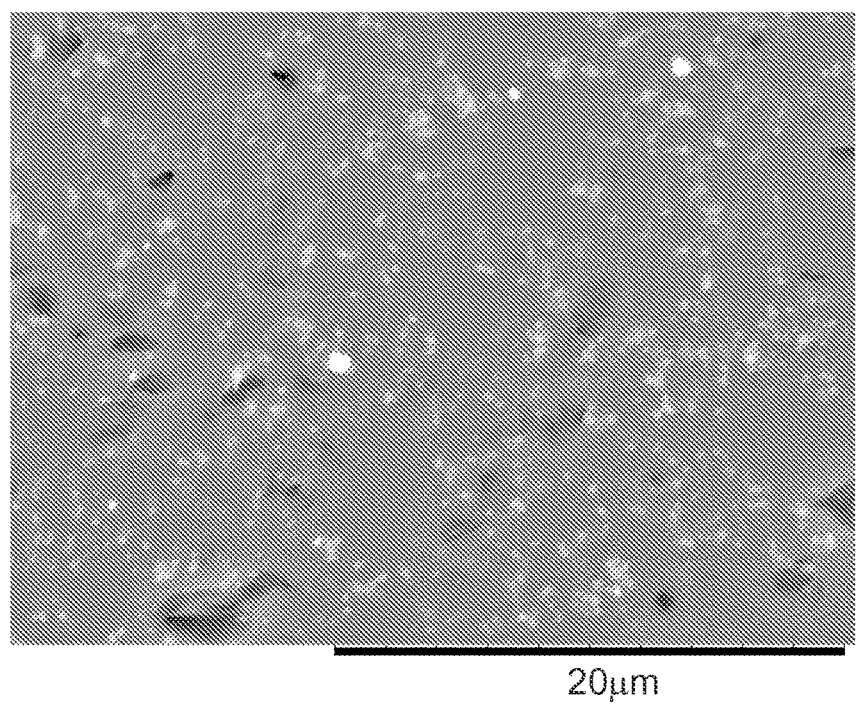

Building materials derived from fine glass particles may be incorporated into suitable building products, such as shingles, roll roofing, cap sheets, stone coated tile, as well as other non-roofing surfaces, such as walls, roads, walkways, and concrete. FIG. 3 shows an exemplary roofing product 300 including a plurality of roofing granules 310 according to the present invention each having a glass substrate with a plurality of pores. Roofing product 300 includes an adhesive layer 320 that adheres granules 310 to substrate layer 330. In some exemplary embodiments, substrate layer 330 may be an asphalt-based substrate including an asphalt saturated material. In other exemplary embodiments, substrate layer 330 may be a film or intermediate layer that may be subsequently joined to an asphalt-based substrate or other substrate.

EXAMPLES

The following specific, but non-limiting examples will serve to illustrate the disclosure.

Three methods of processing were used to generate granule samples for testing: (1) Glass is wet milled, slurry is dried, fired, and then crushed into −12+40 grade (Examples 1-3); (2) Glass is wet milled, slurry is shaped and dried in mold, released from mold, and fired (Examples 4a-4e); (3) Glass is wet milled, slurry is dried, crushed into −12+40 grade, and then fired. (Examples 5-9). Results for samples made using each of the three processing methods are shown in Tables 1-3.

For all examples, reflectivity was measured using a model SSR-ER v6 Solar Spectrum Reflectometer, available from Devices and Services Co. of Dallas, Tex., using a 1.5E air mass setting. For "Cup" measurements, granules were loaded into a sample holder with a depth of approximately 5 mm. The surface of the granules was leveled using a roller. For "Flat" measurements, granules were poured over 471 black vinyl tape, available from 3M Co. of St. Paul, Minn., and pressed to adhere. Pouring and pressing steps repeated 3 to 5 times to ensure good granule coverage on the tape.

For all examples, coverage was measured using I-SOLUTION image analysis software available from IMT-Digital. Area analysis was performed using a manual thresholding tool to determine percentage of the black surface covered by the granules.

Examples 1-3 were prepared by attritor milling glass, obtained by crushing unused clear glass vials of a borosilicate composition. The attritor milling was performed using a Union Process Model 01HD/HDDM Attritor, and adding glass to $H_2O$ at 70% solids loading, and milling with 5 mm yttria-stabilized-zirconia (YSZ) media for three hours. The median primary particle size after milling was 1.3 microns. The slurry was divided into three equal portions, and to each portion was added different types and amounts of pigments (in percentages based on weight of glass solids), as shown in Table 1. After adding the pigments, the slurries were ball milled for approximately one hour with 5 mm YSZ media to homogeneously disperse the pigments. The three prepared slurries were then poured into Pyrex dishes lined with Teflon film, and dried in an oven at 100° C. overnight. The dried slurry "slabs" were then heat treated at 850° C. for four minutes in a box furnace. This heat treatment allowed for viscous sintering of the glass particles to occur and to trap both pores and pigments. The sintered glass slabs were then crushed using a mortar and pestle and sieved to obtain a −12+40 size fraction for analysis. Results are shown below in Table 1.

TABLE 1

| | Example | | |
|---|---|---|---|
| | 1 | 2 | 3 |
| HT Temp (° C.) | 850 | 850 | 850 |
| Time (min) | 6 | 6 | 6 |
| Raw Materials | | | |
| Clean Milled Vial Glass | 91 | 93 | 84 |
| Laponite-RDS | 1 | 1 | 1 |
| RCL-9 $TiO_2$ | 4 | 6 | 5 |
| AC34 $Al_2O_3$ | 0 | 0 | 10 |
| Gold Seal ZnO | 4 | 0 | 0 |
| Reflectivity | | | |
| Cup −12 + 40 | 0.869 | 0.881 | 0.877 |
| Cup −16 + 20 | — | 0.863 | 0.853 |
| Flat −12 + 40 | 0.655 | 0.702 | 0.685 |
| Flat −16 + 20 | 0.620 | 0.664 | 0.672 |
| Coverage | | | |
| −12 + 40 | 0.933 | 0.940 | 0.929 |
| −16 + 20 | 0.887 | 0.893 | 0.895 |

Examples 4a-4e were prepared using a slurry-making process similar to that for Examples 1-3. Examples 4a-4e were compositionally identical to Example 2, which had the highest TSR value of the first 3 examples, 0.702, on a flat black tape. The median glass particle size in the slurry was 1.3 microns. The slurry batch with added pigments was shaped into 2 mm×2 mm×0.5 mm cavities, dried, and then released from the mold. The resulting "tiles" were then fired to various temperatures for either four or eight minutes as represented by Examples 4a-4e shown in Table 2 below and scanning electron microscope (SEM) images revealing the degree of trapped porosity in these samples are shown in FIGS. 4A-4E, respectively.

TABLE 2

| | Example | | | | |
|---|---|---|---|---|---|
| | 4a | 4b | 4c | 4d | 4e |
| HT Temp (° C.) | 700 | 700 | 750 | 750 | 800 |
| Time (min) | 4 | 8 | 4 | 8 | 4 |
| Raw Materials | | | | | |
| Clean Milled Vial Glass | 93 | 93 | 93 | 93 | 93 |
| Laponite-RDS | 1 | 1 | 1 | 1 | 1 |
| RCL-9 TiO$_2$ | 6 | 6 | 6 | 6 | 6 |
| Reflectivity | | | | | |
| Cup 2 × 2 × 0.5 mm | | 0.878 | | | |
| Flat 2 × 2 × 0.5 mm | 0.672 | 0.644 | 0.630 | 0.605 | 0.633 |
| Coverage | | | | | |
| Flat 2 × 2 × 0.5 mm | 0.835 | 0.775 | 0.7732 | 0.7836 | 0.804 |

Examples 5-9 were prepared using a slurry-making process similar to that for Examples 1-3. Primary glass particle sizes in the slurries ranged from median values of 1.2 to 1.5 microns. The slurries with added pigments were pan-dried, similar to that for Examples 1-3. The dried slurry cakes were then crushed using a mortar and pestle, and the crushed particles were sieved to obtain a −12+40 size fraction for analysis. The resulting green granules were then fired to various temperatures for either four or seven minutes. Results are shown below in Table 3.

TABLE 3

| | Example | | | | |
|---|---|---|---|---|---|
| | 5 | 6 | 7 | 8 | 9 |
| HT Temp (° C.) | 775 | 750 | 775 | 775 | 875 |
| Time (min) | 7 | 4 | 7 | 7 | 7 |
| Raw Materials | | | | | |
| Clean Milled Vial Glass | 91.5 | 91.5 | 91 | 91 | 89 |
| Laponite-RDS | 1.5 | 1.5 | 0 | 3 | 1 |
| RCL-9TiO$_2$ | 7 | 7 | 6 | 6 | 10 |
| CaSiO$_3$ | 0 | 0 | 3 | 0 | 0 |
| Reflectivity | | | | | |
| Cup −12 + 40 | 0.892 | 0.900 | 0.867 | 0.890 | 0.892 |
| Flat −12 + 40 | 0.715 | 0.716 | 0.665 | 0.691 | 0.701 |
| Coverage | | | | | |
| Flat −12 + 40 | 0.920 | 0.913 | 0.877 | 0.924 | 0.904 |

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The invention claimed is:

1. A roofing granule comprising a glass substrate comprising greater than 50% by volume of a glass and a plurality of pores within the glass substrate including a closed pore volume percent of at least about 3%, wherein the roofing granule has a minimum total solar reflectance of at least 50%; and wherein the glass is selected from the group consisting of soda lime silica, borosilicate glass, aluminosilicate glass, borate glass, phosphate glass, pre-fused glass, or recycled glass.

2. The roofing granule of claim 1, wherein the roofing granule is uncolored.

3. The roofing granule of claim 1, wherein a volume percent of the plurality of pores in the glass substrate is less than about 35%.

4. The roofing granule of claim 1, wherein the plurality of pores have a diameter of between about 1 μm and 100 μm.

5. The roofing granule of claim 1, and further comprising one or more pigments.

6. The roofing granule of claim 1, wherein the glass substrate comprises a plurality of sections, and wherein a first section of the plurality of sections includes a first porosity and/or a first pigment, and a second section of the plurality of sections includes a second porosity and/or a second pigment.

* * * * *